United States Patent
Shokawa

(10) Patent No.: US 9,027,036 B2
(45) Date of Patent: May 5, 2015

(54) STATUS MANAGEMENT DEVICE, STATUS MANAGEMENT METHOD, AND RECORDING MEDIUM

(75) Inventor: Takashi Shokawa, Tokyo (JP)

(73) Assignee: NEC Corporation, Tokyo (JP)

(*) Notice: Subject to any disclaimer, the term of this patent is extended or adjusted under 35 U.S.C. 154(b) by 2182 days.

(21) Appl. No.: 11/353,519

(22) Filed: Feb. 14, 2006

(65) Prior Publication Data

US 2006/0190585 A1 Aug. 24, 2006

(30) Foreign Application Priority Data

Feb. 23, 2005 (JP) ................................ 2005-047323

(51) Int. Cl.
*G06F 3/00* (2006.01)
*G06F 9/44* (2006.01)
*G06F 9/46* (2006.01)
*G06F 13/00* (2006.01)
*H04W 88/12* (2009.01)
*H04W 24/00* (2009.01)

(52) U.S. Cl.
CPC .............. *H04W 88/12* (2013.01); *H04W 24/00* (2013.01)

(58) Field of Classification Search
CPC ....... H04W 24/00; H04W 88/12; G06F 9/544
See application file for complete search history.

(56) References Cited

U.S. PATENT DOCUMENTS

| | | | | |
|---|---|---|---|---|
| 5,832,226 A | * | 11/1998 | Suzuki et al. | 709/223 |
| 5,903,568 A | * | 5/1999 | Tanaka et al. | 370/469 |
| 5,926,635 A | | 7/1999 | Hsueh et al. | |
| 7,739,385 B1 | * | 6/2010 | Vinjamuri et al. | 709/226 |
| 2002/0118974 A1 | | 8/2002 | Ikeda | |

FOREIGN PATENT DOCUMENTS

| | | |
|---|---|---|
| CN | 1242566 A | 1/2000 |
| CN | 1338077 A | 2/2002 |
| EP | 0 366 583 A2 | 2/1990 |
| EP | 1 274011 A1 | 8/2003 |
| JP | 8-287032 | 11/1996 |

(Continued)

OTHER PUBLICATIONS

Japanese Official Action dated Sep. 29, 2009 with English translation.

*Primary Examiner* — Andy Ho
*Assistant Examiner* — Kimberly Jordan
(74) *Attorney, Agent, or Firm* — Scully, Scott, Murphy & Presser, P.C.

(57) ABSTRACT

A status management device is presented, the device including multiple first application units for monitoring status information indicating a status of a management target, multiple second application units for outputting first acquisition request information of the status information with identification information of the management target, a search unit for outputting a storage location corresponding to the identification information when the first acquisition request information is received from the second application unit, a request unit for outputting second acquisition request information of the status information to the first application unit corresponding to the outputted storage location, and a transmission unit for outputting the status information supplied from the first application unit in response to the second acquisition request information to the second application unit which corresponds to a request source of the first acquisition request information.

17 Claims, 10 Drawing Sheets

(56) References Cited

FOREIGN PATENT DOCUMENTS

| | | |
|---|---|---|
| JP | 9-69083 | 3/1997 |
| JP | 10-40116 | 2/1998 |
| JP | 11-250024 | 9/1999 |
| JP | 11-345215 | 12/1999 |
| WO | WO2004/040424 A2 | 5/2004 |

* cited by examiner

| MANAGEMENT TARGET | STORAGE LOCATION OF STATUS INFORMATION |
|---|---|
| | AP 11 |
| COMMUNICATION CHANNEL A | AP 11 · AREA a1 |
| COMMUNICATION CHANNEL B | AP 11 · AREA b1 |
| COMMUNICATION CHANNEL C | AP 11 · AREA c1 |
| ⋮ | ⋮ |
| INTERFACE CIRCUIT A | AP 11 · NO ERROR |
| ⋮ | ⋮ |

FIG.4

| MANAGEMENT TARGET | STORAGE LOCATION OF STATUS INFORMATION | | |
|---|---|---|---|
| | AP 11 | AP 12 | AP 13 |
| COMMUNICATION CHANNEL A | AP 11 · AREA a1 | AP 12 · AREA a2 | AP 13 · AREA a3 |
| COMMUNICATION CHANNEL B | AP 11 · AREA b1 | AP 12 · AREA b2 | AP 13 · AREA b3 |
| COMMUNICATION CHANNEL C | AP 11 · AREA c1 | AP 12 · AREA c2 | AP 13 · AREA c3 |
| COMMUNICATION CHANNEL D | AP 11 · AREA d1 | AP 12 · AREA d2 | AP 13 · AREA d3 |
| ⋮ | ⋮ | ⋮ | ⋮ |

| ADDRESS | MANAGEMENT TARGET | CONNECTION STATUS |
|---|---|---|
| AREA a1 | COMMUNICATION CHANNEL A | DISCONNECTED |
| AREA b1 | COMMUNICATION CHANNEL B | CONNECTED |
| ⋮ | ⋮ | ⋮ |

| ADDRESS | MANAGEMENT TARGET | ERROR STATUS ON COMMUNICATION CHANNEL |
|---|---|---|
| AREA a2 | COMMUNICATION CHANNEL A | ERROR RATE 0.1% |
| AREA b2 | COMMUNICATION CHANNEL B | ERROR RATE 0.2% |
| ⋮ | ⋮ | ⋮ |

| ADDRESS | MANAGEMENT TARGET | LOCK STATUS |
|---|---|---|
| AREA a3 | COMMUNICATION CHANNEL A | OFF |
| AREA b3 | COMMUNICATION CHANNEL B | ON |
| ⋮ | ⋮ | ⋮ |

FIG.8C

STATUS MANAGEMENT DEVICE, STATUS MANAGEMENT METHOD, AND RECORDING MEDIUM

BACKGROUND OF THE INVENTION

1. Field of the Invention

The present invention relates to a status management device, a status management method, and a recording medium, for managing status information within a device. The present invention relates, in particular, to a status management device, a status management method, and a recording medium, for transmitting status information between an application that processes the status information of a communication channel or the like in a device and another application that requires the status information.

2. Description of the Related Art

A general device stores a plurality of applications to execute processings based on the stored applications. Furthermore, in many cases, the plurality of applications in the device work together to execute a processing. For this reason, the device is required to transfer information of a status related to the processing handled by one application to another application.

In general, in a device operated by program control, a management unit for managing a status retains status information in a concentrated manner. Moreover, in general, in the device operated by program control, an application that requests status information directly obtains the status information through an application processing the status information.

A method of allowing a computer system to manage status information is disclosed in, for example, JP 9-69083 A (hereinafter, referred to as Reference 1). Specifically, a management unit of the computer system gathers status information from each agent by polling to register the gathered status information in a constitution management database. In this manner, the management unit of the computer system manages the status information such as a system program or a business program in an integrated fashion.

However, in the above-described general management method the application processing status information (for example, an application for controlling and monitoring a communication channel or the like) and a management application for managing the status information (the management unit for managing the status information) both manage the status information in a separate manner. Therefore, in the above-described general management method, the management unit is required to manage the latest status. If the management unit does not consequently monitor the application having the status information, there arises a problem that inconsistency in status occurs between the application processing the status information and the management application (unit).

Moreover, the above-described general method of transmitting the status information between the applications, it is necessary for each application to separately manage a query destination and a notification destination of the status. Therefore, the above-described general method of transferring status information between the applications has a problem that the implementation or maintenance of applications becomes complicated as the number of related applications increases.

Furthermore, according to the invention described in the above-cited Reference 1, the device that processes the status (agent) and the management unit that has to constantly manage the status information, in view of the system architecture, both manages the status information in a separate manner.

Therefore, in the invention described in the above-cited Reference 1, the management unit is required to manage the latest status. If the management unit does not consequently monitor all the agents (for example, reduce a time interval between pollings), there arises a problem that inconsistency in status occurs between the application and the management unit. Furthermore, in the above-cited Reference 1, since the management unit has to consequently monitor all the agents (for example, to reduce a time interval between pollings), there is a problem that a load on a CPU disadvantageously increases as the number of agents increases.

SUMMARY OF THE INVENTION

In view of the above problems, the present invention has an exemplary feature of providing a status management device, a status management method, and a recording medium, which allow applications to transmit the current status without being conscious of each other's presence and without keeping status information in a status-information management unit in an integrated manner.

To achieve the above-mentioned exemplary feature, a status management device according to the present invention includes: one or a plurality of first application units for monitoring status information indicating a status of a management target; one or plurality of second application units for outputting first acquisition request information of the status information with identification information of the management target; a search unit for outputting a storage location corresponding to the identification information when the first acquisition request information is received from the second application unit; a request unit for outputting second acquisition request information of the status information to the first application unit corresponding to the outputted storage location; and a transmission unit for outputting the status information supplied from the first application unit in response to the second acquisition request information to the second application unit which corresponds to a request source of the first acquisition request information.

Also, to achieve the above-mentioned exemplary feature, a status management method according to the present invention includes: providing one or a plurality of first application units for monitoring status information indicating a status of a management target; providing one or plurality of second application units for outputting first acquisition request information of the status information with identification information of the management target; outputting a storage location corresponding to the identification information when the first acquisition request information is received from the second application unit; outputting second acquisition request information of the status information to the first application unit corresponding to the outputted storage location; and outputting status information supplied from the first application unit in response to the second acquisition request information to the second application unit which corresponds to a request source of the first acquisition request information.

Also, to achieve the above-mentioned exemplary feature, a recording medium for storing a program according to the present invention includes a plurality of application units operated by program control. The recording medium stores the program for causing the computer to execute the processings of: outputting a storage location corresponding to received identification information when first acquisition information of status information with the identification information for identifying a management target is received from a first application unit requiring the status information; outputting second acquisition information of the status information to a second application unit corresponding to the outputted storage location; and outputting the status information supplied from the second application unit in response to the second acquisition request information to the first application unit corresponding to a request source of the first acquisition request information.

Therefore, in the above-described invention, instead of storing status information in a status-information management unit (an application for managing status information), the latest status information is obtained from an application having the status information in response to an acquisition request information of the status information from another application. Therefore, the above-described invention has the effect in that it is no longer necessary to confirm whether or not the status-information management unit always keeps the latest status for the application having the status information.

Moreover, in the above-described invention, when the application requiring status information needs to obtain the status information from the application having the status information, the status information is obtained only through the transmission and reception of identification information to be managed to/from the status-information management unit. Therefore, the above-described invention has the effect in that the applications are not required to be conscious of each other's presence.

BRIEF DESCRIPTION OF THE DRAWINGS

These and other aspects, features and advantages of the invention will become more fully apparent from the following detailed description taken in conjunction with accompanying drawings. In the drawings:

FIG. 4 is a structure view showing the contents stored in a registration-information memory unit shown in FIG. 2;

FIG. 7 is a structure view showing the contents stored in a registration-information memory unit shown in FIG. 5;

FIG. 8A is a structure view showing the contents stored in a status memory unit shown in each of FIG. 2, 5, 9;

FIG. 8B is a structure view showing the contents stored in the status memory unit shown in FIG. 5;

FIG. 8C is a structure view showing the contents stored in a status memory unit shown in FIG. 5;

DETAILED DESCRIPTION OF THE EXEMPLARY EMBODIMENTS

Next, exemplary embodiments of the present invention will be described with reference to the accompanying drawings.

Figure 1:
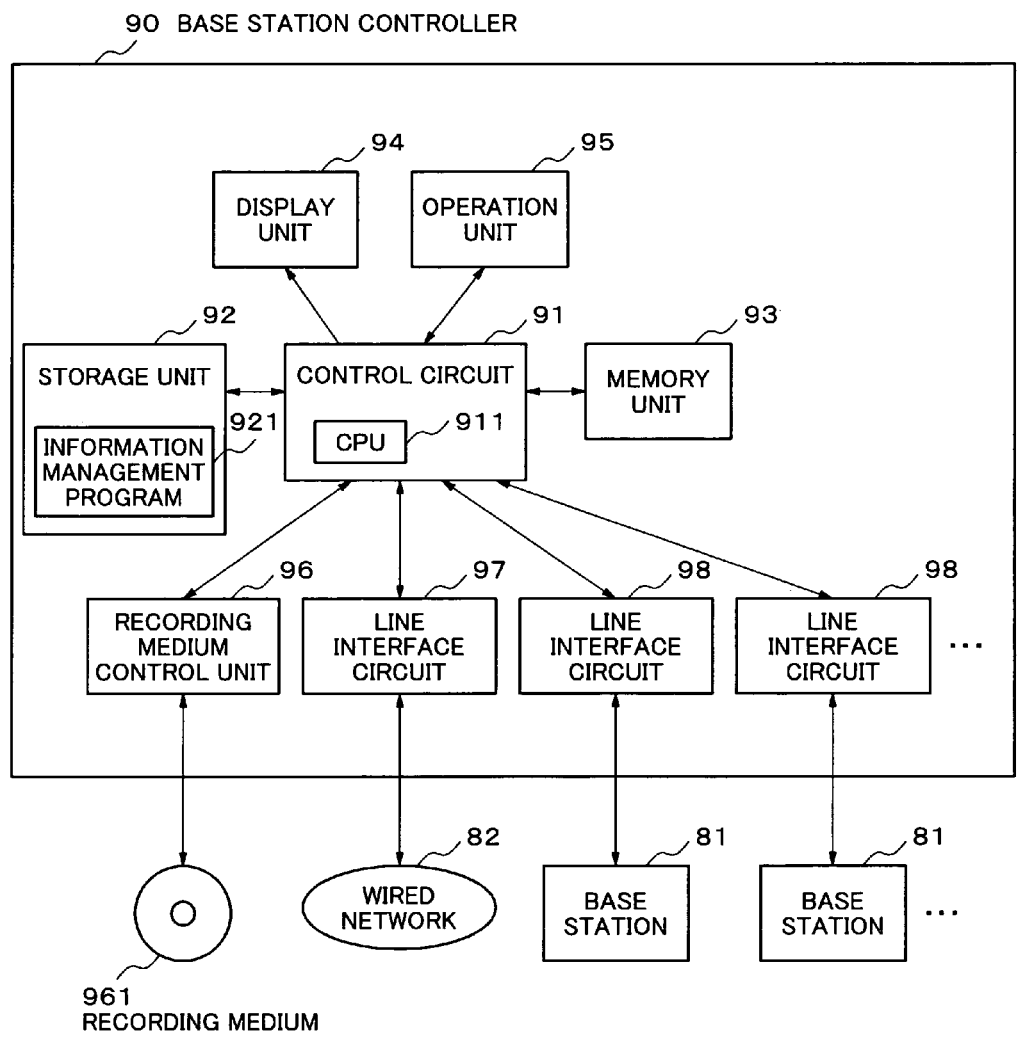
FIG. 1 is a block diagram showing a system configuration including a status management device (a base station controller) according to first through third embodiments.

FIG. 1 is a block diagram showing a configuration of a system according to the first embodiment of the invention. The system includes a base station controller as an example of a status management device.

The system shown in FIG. 1 includes a base station controller 90, a recording medium 961, base stations 81, and a wired network 82.

The base station 81 is a wireless base station for wirelessly transmitting and receiving data to/from a plurality of wireless terminals (not shown).

The base station controller 90 includes a control circuit 91, a storage unit 92, a memory unit 93, a display unit 94, an operation unit 95, a recording medium control unit 96, a line interface circuit 97, and a plurality of line interface circuits 98.

The storage unit 92 is a non-volatile recording medium device (for example, a magnetic disk, or an optical disk). The storage unit 92 stores various programs including an information management program 921.

The memory unit 93 is a volatile memory (for example, a Random Access Memory). The memory unit 93 includes a work area for allowing the control circuit 91 to perform various processings and a program area. Upon start-up of the base station controller 90, various programs including the information management program 921 are loaded from the storage unit 92 into the program area of the memory unit 93. The control circuit 91 includes a CPU (Central Processing Unit) 911 that executes various programs stored in the program area.

The control circuit 91 controls the entire base station controller 90. The CPU 911 executes various programs stored in the storage unit 92 and the control unit 91 controls the memory unit 93 to be operated under the program control. Specifically, when the base station controller 90 is powered ON, the control circuit 91 executes a program stored in a ROM (Read Only Memory) (not shown). Then, the control circuit 91 loads various programs stored in the storage unit 92 into the program area of the memory unit 93 to execute loaded various programs in response to an external command, reception, or the like. In this case, the control circuit 91 controls the recording medium control unit 96, the line interface circuit 97, the plurality of line interface circuits 98, the storage unit 92, the memory unit 93, the display unit 94, the operation unit 95, and the like. It is preferred that the program loaded into the program area of the memory unit 93 is deployed in a machine language directly executable by the CPU 911.

The recording medium control unit 96 is a device, for example, a CD-ROM drive device, a rewritable drive device, or a DVD Burning drive device, which is capable of reading the recording medium 961.

The recording medium 961 is a recording medium such as a CD-ROM, a CD-R, or a DVD. On the recording medium 961, the information management program 921 is written in advance.

The line interface circuit 97 transmits and receives data to/from a device (for example, an SGSN) connected to the wired network 82 under the control of the control circuit 91. The SGSN is an abbreviation for Serving General Packet Radio Service Node.

The line interface circuits 98 transmit and receive data to/from the base station 81 under the control of the control circuit 91.

The display unit 94 includes, for example, a liquid crystal panel. The display unit 94 displays each information under the control of the control circuit 91.

The operation unit 95 is, for example, a keyboard including various key buttons and the like. The operation unit 95 accepts various key operations by an operator under the control of the control circuit 91.

For the information management program 921, the control circuit 91 installs the information management program 921 from the recording medium 961 on the storage unit 92 by a key operation of the operator. Specifically, the operator sets the recording medium 961 into the recording medium control unit 96 so as to direct the installation of the information management program 921 written on the recording medium 961 through the operation unit 95. As a result, the control circuit 91 stores the information management program 921 in the storage unit 92. It is not always necessary for the operator to install the information management program 921 on the storage unit 92 after the system introduction. A manufacturer may pre-install the information management program 921 on the storage unit 92 at the time of factory shipment.

Next, a first embodiment of the present invention will be described with reference to FIGS. 1 through 4 and FIG. 8A.

Figure 2:
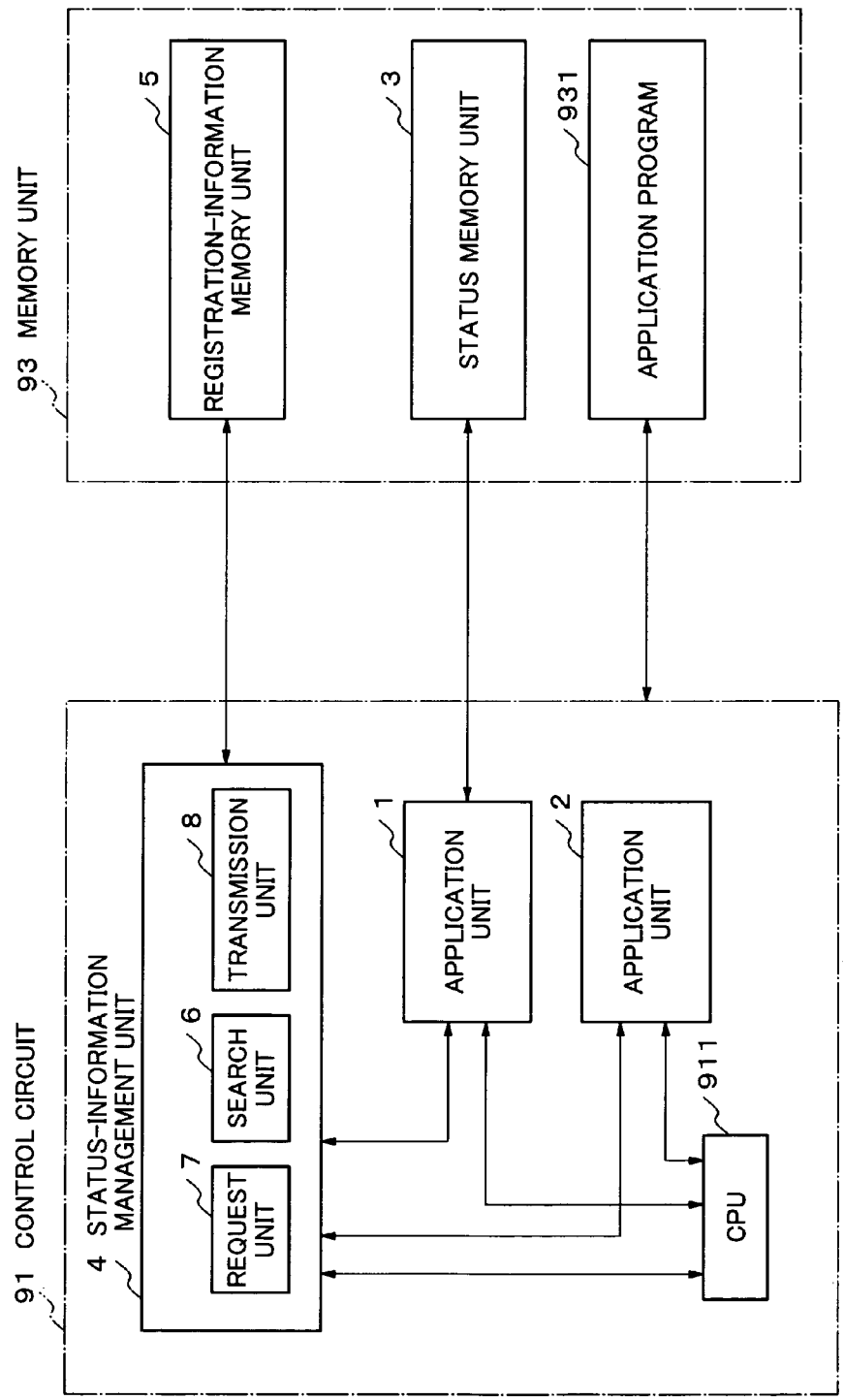
FIG. 2 is a block diagram showing configurations of a control circuit and a memory unit shown in FIG. 1 according to the first embodiment.

FIG. 2 is a view showing a configuration of the control circuit 91 and a configuration of the memory unit 93 shown in FIG. 1. The CPU 911 of the control circuit 91 is connected to each of the storage unit 92, the display unit 94, the operation unit 95, the recording medium control unit 96, the line interface circuit 97, and the line interface circuits 98. However, the storage unit 92, the display unit 94, the operation unit 95, the recording medium control unit 96, the line interface circuit 97, and the line interface circuits 98, which are connected to the CPU 911, are omitted from FIG. 2.

The control circuit 91 includes the CPU 911, a status-information management unit 4, an application unit 1, and an application unit 2.

The memory unit 93 includes a registration-information memory unit 5, a status memory unit 3, and an application program 931. Specifically, the registration-information memory unit 5 and the status memory unit 3 are allocated to the working area in the memory unit 93, while various programs including the application program 931 are stored in the program area in the memory unit 93. Although a plurality of programs as well as the application program 931 are written in the memory unit 93 during the operation, they are omitted from FIG. 2.

The registration-information memory unit 5 contains, for example, as shown in FIG. 4, an item of a management target and an item of a storage location of status information for each management target. Specifically, the content the management target item includes management target identification information (for example, "a communication channel A", "a communication channel B", or "an interface circuit A" corresponding to a communication channel with the base station or its own line interface circuit 98) corresponding to information for identifying status information to be managed. The content of the item of the storage location includes storage location information corresponding to a management target (the management target identification information, for example, application identification information and an address in the memory unit 93).

The status memory unit 3 includes, for example, as shown in FIG. 8A, an address item, a management target item, and an item of a connection status corresponding to status information. The connection status is managed for each management target corresponding to the address. Specifically, the content of the field of the address item contains the storage location for both the management target identification information and the connection status information (for example, the address in the memory unit 93). The content of the management target item includes the management target identification information for identifying status information to be managed (for example, a communication channel with the base station or its own line interface circuit 98). The content of the item of the connection status corresponding to the status information includes information of a connection status (for example, disconnected or connected) corresponding to the management target (the management target identification information). Although only the connection status is shown as the status information in FIG. 8A, a plurality of status information may be present (for example, a connection status, or error information on a communication channel).

On the other hand, in FIG. 2, the application program 931 executed by the CPU 911 includes the information management program 921 shown in FIG. 1, and an application, program a and a monitor program (not shown). A case where each of the status-information management unit 4 and the application units 1 and 2 executes its own program will be described below.

The status-information management unit 4 executes the information management program 921 under the control of the CPU 911 to manage registration information in the status memory unit 3, which is managed by the application unit 1. Furthermore, the status-information management unit 4 includes a search unit 6, a request unit 7, and a transmission unit 8 and controls them. When a request for reading the status information, to which the management target identification information is added, is made from the application unit 2, the search unit 6 searches and reads out a storage location of the status information from the registration-information memory unit 5 (see FIG. 4) based on the management target identification information as a key for extracting the storage location of the status information. Based on the storage location found in the search, the request unit 7 makes a request for the status information to the application unit 1. The transmission unit 8 obtains the status information requested by the request unit 7 through the application unit 1 and transmits the obtained status information to the application unit 2. The storage location of the status information is registered in advance by the status-information management unit 4. Specifically, the status-information management unit 4 uses the management target identification information ("the communication channel", "the interface circuit", or the like) stored in the status memory unit 3 as a key to register the storage location of the status information corresponding to the management target identification information in the registration-information memory unit 5 based on the request of registering the storage location of the status information from the application unit 1.

The application unit 1 executes the application program a under the control of the CPU 911 to perform processings including management of connection statuses of the plurality of line interface circuits 98 and communication control with the base station 81. For example, the application unit 1 constantly monitors the status information including information indicating that the status of each of the line interface circuits 98 (the communication channel with each of the base stations 81) is "connected" or "disconnected" and an error in the line interface circuit 98. Furthermore, the application unit 1 stores the status information containing the monitored connection status of the communication channel and an error in the line interface circuit 98 itself in the status memory unit 3. Upon detection of a status change, the application unit 1 rewrites a part of the content in the status memory unit 3, in which the status change occurs.

The application unit 2 executes a monitor program under the control of the CPU 911 to monitor the plurality of line interface circuits 98. Furthermore, the application unit 2 indicates connection information of the communication channel on the display unit 94 when a change occurs in a connection status of the communication channel between a particular one of the line interface circuits 98 and the base station 81. In this case, when a status change occurs, the application unit 2 may notify the exterior (for example, a terminal connected to the wired network 82) of the occurrence of the status change. Alternatively, if the application unit 2 detects the disconnection of the communication channel or an error in the line interface circuit 98, the line interface circuit 98 may be switched to another one.

The above-described monitor program is a program for the application unit 2 to monitor a particular one of the line interface circuits 98. For easy understanding of the description, it is assumed that the operator can execute the monitor program through the operation unit 95. In this case, for start-up of the monitor program, the operator selects one from the plurality of line interface circuits 98 on the operation unit 95. Therefore, the application unit 2 monitors the communication channel (in the example, "the communication channel A") between the selected particular one of the line interface circuits 98 and the base station 81.

In the first embodiment, the monitor program is given as an example of the programs executed by the application unit 2. However, any program may be used as an application executed by the application unit 2 as long as the operation is required to be switched in accordance with the status information containing the connection status of the communication channel managed by the application unit 1 and therefore is not particularly limited.

For convenience of the description, in the first embodiment, the application unit 1 is an application providing the status information, while the application unit 2 is an application requesting the status information. In practice, each of the applications can be any of the application providing the status information and the application requesting the status information.

A format of the registration-information memory unit 5 is determined at the time of system construction. The identification information of the application unit 1 and the management target identification information, which are to be format information, are preset in the storage unit 92. Therefore, the status-information management unit 4 creates the registration-information memory unit 5 in the memory unit 93 based on the format information of the registration-information memory unit 5 set in the memory unit 92 for the start-up of the system. In this case, among the management target items and the items of storage locations of the status, the identification information of the application unit 1 (in the example, "AP11"; see reference numeral 51 of FIG. 4) and a plurality of management target identification information are registered in the registration-information memory unit 5. During the operation, storage location information (application identification information and an address) is registered in an area for the storage location corresponding to the management target in the registration-information memory unit 5. Upon start-up of the system, the area is left blank.

If there are a plurality of applications providing status information, which are different from the above-described management target, the status-information management unit 4 creates the registration-information memory unit 5 for each application in the same procedure as described above.

When the application units 1 and 2 transmit and receive data to/from the status-information management unit 4, the data transmission and reception are performed through, for example, a specific area (not shown) in the memory unit 93. Specifically, when outputting (transmitting) request information (containing added information) or data information to the destination, each of the application units 1 and 2 and the status-information management unit 4 writes the request information or the requested data information in the specific area in the memory unit 93. When receiving the request information from an other party of the communication (the application unit 1 or 2, or the status-information management unit 4), each of the application units 1 and 2 and the status-information management unit 4 analyzes the request information written in the specific area to execute it. After the completion of the processing according to the analysis, the request information is cleared. The request information according to the first embodiment of the present invention of this case means, for example, information for a registration request (for example, a registration request of a storage location), information for an acquisition request (for example, an acquisition request (a read request) of status information), and the like. The requested data information means data (for example, status information) read out in response to the request information (the acquisition request of the data) In the following description of the operation, the above-described description is omitted for easy understanding of the description. Only the transmission and reception of the request information or the data information will be described.

Next, with reference to FIGS. 1 through 4 and 8A, the operation according to the first embodiment of the present invention will be described in detail.

Figure 3:
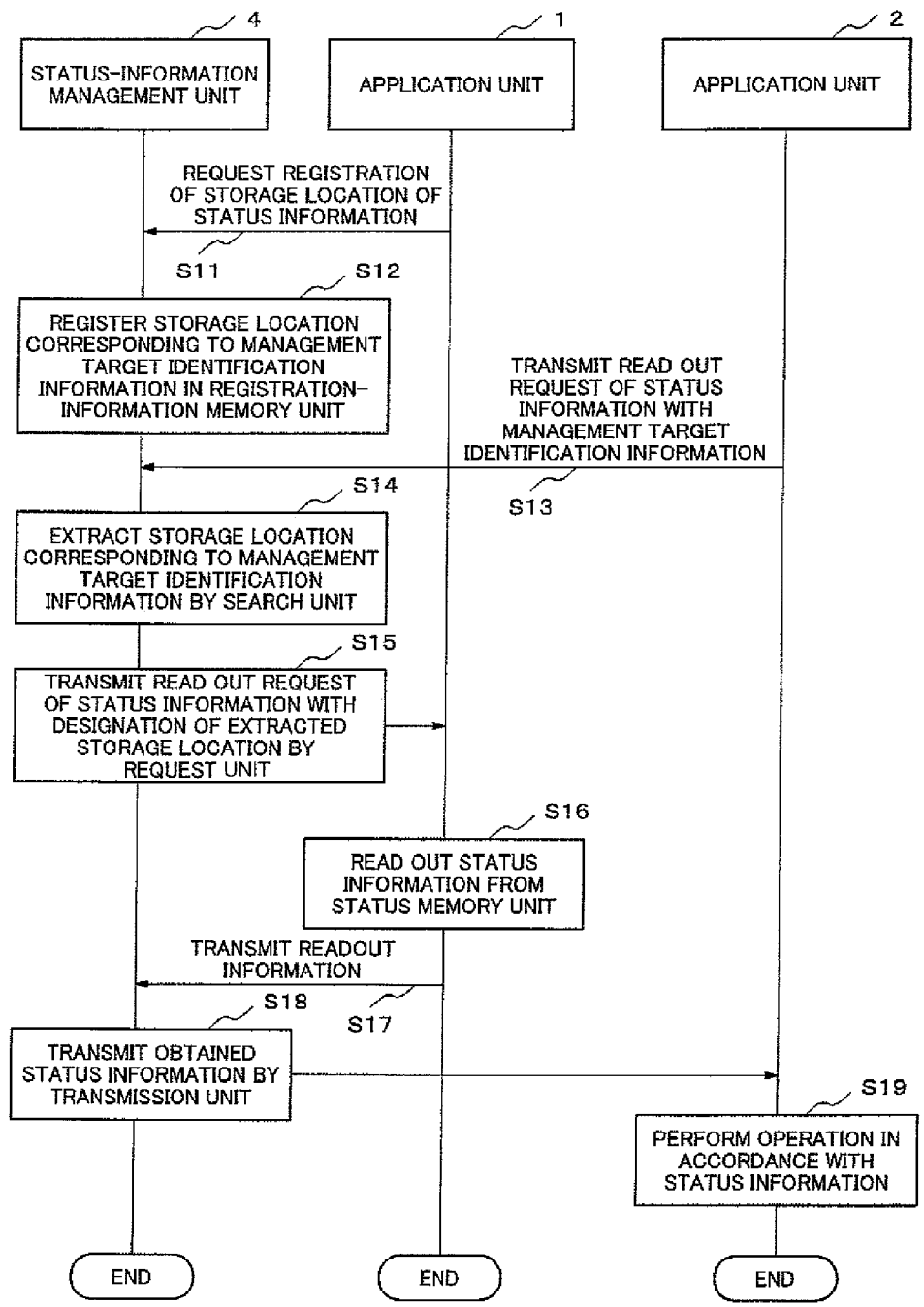
FIG. 3 is a sequence diagram showing an operation according to the first embodiment.

FIG. 3 is a sequence diagram showing the operation according to the first embodiment.

First, the application unit 1 transmits the management target identification information (the communication channel A, the communication channel B, and so on of FIG. 4) kept in advance and the request information for registering the storage location of the status information (an area a1 in the status memory unit 3, an area b1 in the status memory unit 3, and so on) to the status-information management unit 4. The areas a1 and b1 in this case are addresses in the memory unit 93. Then, the status-information management unit 4 registers the storage location information (for example, the AP11 and the memory address) based on the registration information including the management target identification information and the storage location (for example, the memory address), for which the request information is addressed, in the registration-information memory unit 5 in the memory unit 93. A detailed registration processing in this case is as follows.

For example, upon start-up of the base station controller 90, the application unit 1 creates the status memory unit 3. Specifically, the application unit 1 sequentially confirms the presence/absence of the line interface circuits 98. If the line interface circuit 98 is present, an address is allocated to the present line interface circuit 98. Furthermore, the application unit 1 generates management target identification information (for example, "the communication channel A") to be set in the area indicated by the allocated address and sets the generated identification information in the area indicated by the allocated address. In this case, the area indicated by the allocated address is preserved so as to store a connection status. The information set in the preserved area may include information such as the identification information of the line interface circuits 98 in addition to the management target identification information and the connection status. In this manner, the application unit 1 checks all the line interface circuits 98 to create the status memory unit 3. The status memory unit 3 created at this time is, for example, that shown in FIG. 8A. After that, the application unit 1 transmits the registration request information. The registration request information in this case contains the management target identification information and its storage location (for example, the address in the memory) to the status-information management unit 4 to make a registration request (sequence S11 of FIG. 3). After the registration request, the application unit 1 performs a connecting operation with the base station for each of the line interface circuits 98. The application unit 1 registers the result of the connecting operation ("connected" or "disconnected") in the area of the corresponding connection status in the status memory unit 3.

On the other hand, the status-information management unit 4 receiving the request information uses the management target identification information as a key to store the storage location of the status information corresponding to the management target identification information in the registration-information memory unit 5 as shown in FIG. 4 (sequence S12). In this case, the storage location information contains the identification information of the application and the memory address. In this manner, the status-information management unit 4 performs the registration processing of the storage location of the status information corresponding to the application 1, and terminates the process of creating the registration-information memory unit 5 at the time of start-up of the device.

Next, the application unit 1 monitors the communication channel for each of the line interface circuits 98. When a status change occurs, the result of change ("connected" or "disconnected") is registered in the area of the corresponding connection status in the status memory unit 3. For example, it is assumed that the application unit 1 recognizes that the connection status of the communication channel A changes to "connected". In this case, the application unit registers 1 registers (overwrites) "connected" in the area of the connection status of the communication channel A in the status memory unit 3.

When the information of "the communication channel A" is required to be read out, the application unit 2 sends the request information for reading out the status information to the status-information management unit 4. The request information in this case contains the management target identification information, i.e., "the communication channel A", as a key for reading out the status information. In the example, a predetermined value is set for a timer (not shown) so as to enable an interrupt action to the application unit 2 in the control circuit 91 at predetermined time intervals. Each time the application unit 2 is interrupted by the timer, the application unit 2 transmits the request information for reading out the status information to the status-information management unit 4 (sequence S13).

The status-information management unit 4 receiving the request information passes control to the search unit 6. The search unit 6 searches and reads out the storage location information of the status information from the registration-information memory unit 5 based on the received "communication channel A" as a key to extract the status information corresponding to the result "the area a1 in the AP11" (sequence S14). The search unit 6 passes control to the request unit 7.

The request unit 7 of the status-information management unit 4 adds information containing the storage location information ("the area a1 in the AP11") and the management target identification information ("the communication channel A") to the request information and transmits the request information for reading out the status information to the application unit 1 corresponding to the AP11 (sequence S15).

The application unit 1 receiving the request information reads out the status information "connected" from the status memory unit 3 based on the received "the area a1" and "the communication channel A" to transmit the readout status information to the status-information management unit 4 (sequences S16 and S17). In this case, since the application unit 1 can use the memory address to directly designate the storage location of the status information, a search time can be reduced as compared with a search method of using the management target identification information.

The application unit 1 may also use only the management target identification information to search through the status memory unit 3 to extract the connection information corresponding to the status information although a processing time is longer than that of the direct access to the memory. Therefore, when only the management target identification information 1 is used, the memory address may be omitted from the registration-information memory unit 5. In this case, however, application identification information is required as information of the storage location.

On the other hand, the status-information management unit 4 receiving the status information passes control to the transmission unit 8. The transmission unit 8 taking control transmits the status information received from the application unit 1 to the application unit 2 corresponding to a request source (sequence S18).

The application unit 2 receiving the status information indicating that "the communication channel A" is in a "connected" status switches its operation in accordance with the status. Specifically, since the communication channel A is successfully connected to the base station 81, the application unit 2 indicates the successful connection information on the display unit 94 (sequence S19). It is assumed that the application unit 1 recognizes that the communication channel A is in an "disconnected" status at the beginning.

As described above, the status-information management unit 4 receives the request information for obtaining the status information, to which the management target identification information is added, from the application unit 2 requiring the status information. Then, the status-information management unit 4 extracts the storage location information from the registration-information memory unit 5 to transmit the request information with the storage location information for obtaining the status information to the application unit 1. Therefore, in the first embodiment of the present invention, the status-information management unit (application for managing the status information) does not retain the status information to obtain the latest status information from the application having the status information in response to the request information for obtaining the status information from one application. Therefore, in the first embodiment of the present invention, the status-information management unit 4 is not required to confirm whether or not the application unit 1 retains the latest status information.

Moreover, in the first embodiment of the present invention, the application unit 1 and the application unit 2 are not required to be conscious of each other's presence. Therefore, the status information can be transmitted and received between the applications in a simple control procedure.

Furthermore, in the first embodiment of the present invention, since it is not necessary to manage the status information in which a change frequently occurs, inconsistency in status does not occurs between the application unit 1 and the status-information management unit 4. Moreover, in the first embodiment of the present invention, even if the number of the application unit 1 increases, it is not necessary to manage the status information in which a change frequently occurs. Accordingly, a load on a CPU does not increase.

In the above-described first embodiment, after the status-information management unit 4 receives the request information for obtaining the status information from the application unit 2, the search unit 6 in the status-information management unit 4 extracts the storage location information corresponding to the management target identification information from the registration-information memory unit 5. In the first embodiment, however, instead of using the registration-information memory unit 5, the search unit may calculate the storage location information corresponding to the management target identification information by a calculation formula. In this case, the management target identification information corresponds to an input of the calculation formula, while the storage location information corresponds to an output of the calculation formula.

Next, a second embodiment of the present invention will be described with reference to FIGS. 1, 5 through 7, and 8A through 8C.

Figure 5:
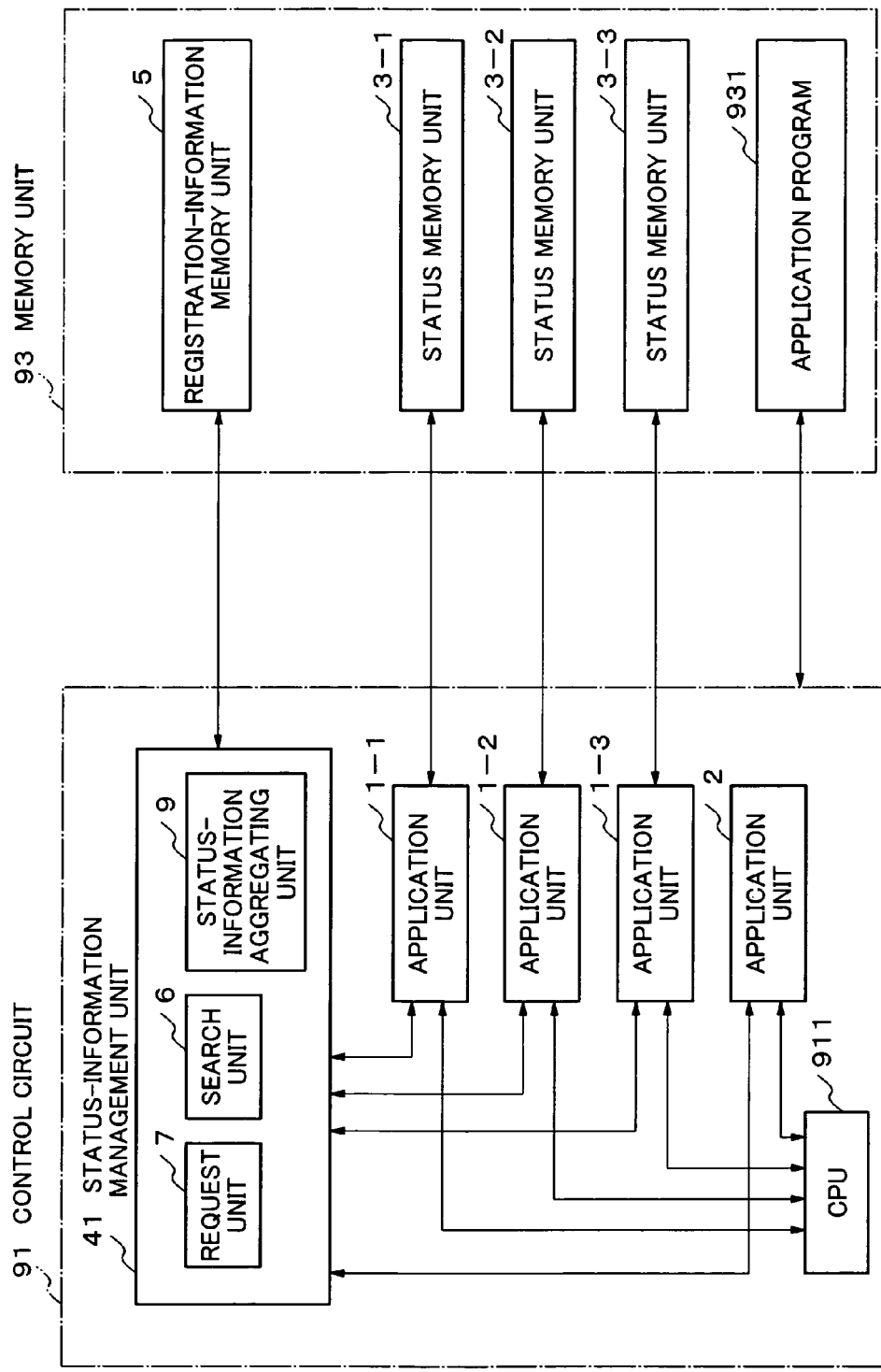
FIG. 5 is a block diagram showing configurations of the control circuit and the memory unit shown in FIG. 1 according to the second embodiment.

FIG. 5 is a view showing configurations of the control circuit 91 and the memory unit 93 shown in FIG. 1. The CPU 911 in the control circuit 91 is connected to each of the storage unit 92, the display unit 94, the operation unit 95, the recording medium control unit 96, the line interface circuit 97, and the line interface circuits 98. However, the storage unit 92, the display unit 94, the operation unit 95, the recording medium control unit 96, the line interface circuit 97, and the line interface circuits 98, which are connected to the CPU 911, are omitted from FIG. 5.

The control circuit 91 includes the CPU 911, a status-information management unit 41, and application units 1-1, 1-2, 1-3, and 2.

The status-information management unit 41 includes the request unit 7, the search unit 6, and a status-information aggregating unit 9.

The memory unit 93 includes the registration-information memory unit 5, status memory units 3-1, 3-2, and 3-3, and the application program 931. During the operation of the base station controller 90, various programs are written to the memory unit 93. Various programs as well as the application program 931 are also omitted from FIG. 5.

The second embodiment differs from the first embodiment in that the transmission unit 8 is replaced by the status-information aggregating unit 9, the application unit 1 is replaced by the application units 1-1, 1-2, and 1-3, and the status memory unit 3 is replaced by the status memory units 3-1, 3-2 and 3-3. Furthermore, the second embodiment also differs from the first embodiment in that the plurality of application units 1, each corresponding to a management target, are provided in the registration-information memory unit 5. Specifically, the second embodiment presupposes that the application unit 2 transmitting an acquisition request of information of a status corresponding to at least one management target are provided, and that the application units 1-1, 1-2, and 1-3 retaining different types of status information corresponding to at least one management target are provided. For this reason, the second embodiment includes the status-information aggregating unit 9. Specifically, the status-information aggregating unit 9 obtains the status information corresponding to one management target requested to the plurality of application units 1-1, 1-2, and 1-3 by the request unit 7 from each of the application units 1-1 to 1-3, and then aggregates a plurality of obtained status information to transmit the aggregated status information to the application unit 2.

The application program 931 executed by the control circuit 91 includes the information management program 921, application programs a1, a2, and a3, and the monitor program (not shown). In this case, the status-information management unit 41 executes the information management program 921 under the control of the CPU 911 to manage the registration information of the status memory unit 3 managed by the application units 1-1 to 1-3. The application unit 1-1 executes the application program a1 under the control of the CPU 911. The application unit 1-2 execute the application program a2 under the control of the CPU 911. The application unit 1-3 executes the application program a3 under the control of the CPU 911. Each of the application units 1-1 to 1-3 in this case performs processings including management of the connection statuses of the plurality of line interface circuits 98, communication control with the base station 81, and the like. The application unit 2 executes the monitor program under the control of the CPU 911 to monitor the plurality of line interface circuits 98. The monitor program is the same as described in the first embodiment.

Furthermore, for easy understanding of the description, it is assumed that the application program a1 is a program for managing the connection status, the application program a2 is a program for managing error information of the communication channel, and the application program a3 is a program for managing a lock status. The error information on the communication channel in this case is, for example, error information such as an error rate and a channel number which cannot be used for an error. In the second embodiment, the following description is given assuming that the error information is an error rate. The lock status is, for example, the following status. When a maintenance person sets "lock ON" for a specific communication channel through the operation unit 95, the set specific communication channel is forced to be in an unusable status. Therefore, for example, when there is the application unit 2 using the communication channel B, the application unit 2 cannot use the communication channel B with the base station 81 even if the communication channel is in a connected status.

The format of the registration-information memory unit 5 is determined at the time of system construction. The identification information of the application units 1-1 to 1-3 and the management target identification information, which are to be format information, are preset in the storage unit 92. Therefore, the status-information management unit 41 of the control circuit 91 creates the registration-information memory unit 5 in the memory unit 93 based on the format information of the registration-information memory unit 5 set in the memory unit 93 for the start-up of the system. In this case, among the management target items and the items of storage locations of the status, the identification information of the application units 1-1 to 1-3 (in the example, "AP11", "AP12", and "AP13"; see reference numerals 51, 52, and 53 in FIG. 7) and the plurality of management target identification information are registered in the registration-information memory unit 5. Specifically, during the operation, storage location information (application identification information and an address) is registered in an area for the storage location corresponding to the management target in the registration-information memory unit 5. However, upon start-up of the system, the area is left blank.

If there are a plurality of applications providing status information which is different from the above-described management target, the status-information management unit 41 creates the registration-information memory unit 5 for each application in the same procedure as described above.

When the application units 1-1 to 1-3 transmit and receive data to/from the status-information management unit 4, the data transmission and reception are performed through, for example, a specific area (not shown) in the memory unit 93. Specifically, when outputting (transmitting) request information (containing added information) or data information to the destination, each of the application units 1-1 to 1-3 and 2, and the status-information management unit 41 writes the request information or the requested data information in the specific area in the memory unit 93. When receiving the request information from an other party of the communication, each of the application units 1-1 to 1-3 and 2 and the status-information management unit 41 analyzes the request information written in the specific area to execute it. After the completion of the processing according to the analysis, the request information is cleared. The request information according to the second embodiment of the present invention in this case means, for example, information for a registration request (for example, a registration request of a storage location), information for an acquisition request (for example, an acquisition request (a read request) of status information), and the like. The requested data information means data (for example, status information) read out in response to the request information (for example, the acquisition request of the data). In the following description of the operation, the above-described description is omitted for easy understanding of the description and only the transmission and reception of the request information or the data information will be described. Furthermore, for easy understanding of the description, the registration information request information is referred to as the registration request and the acquisition request information is referred to as the acquisition request (or the read request).

Next, with reference to FIGS. 1, 5 to 7, and 8A to 8C, the operation of the second embodiment of the present invention will be described in detail.

Figure 6:
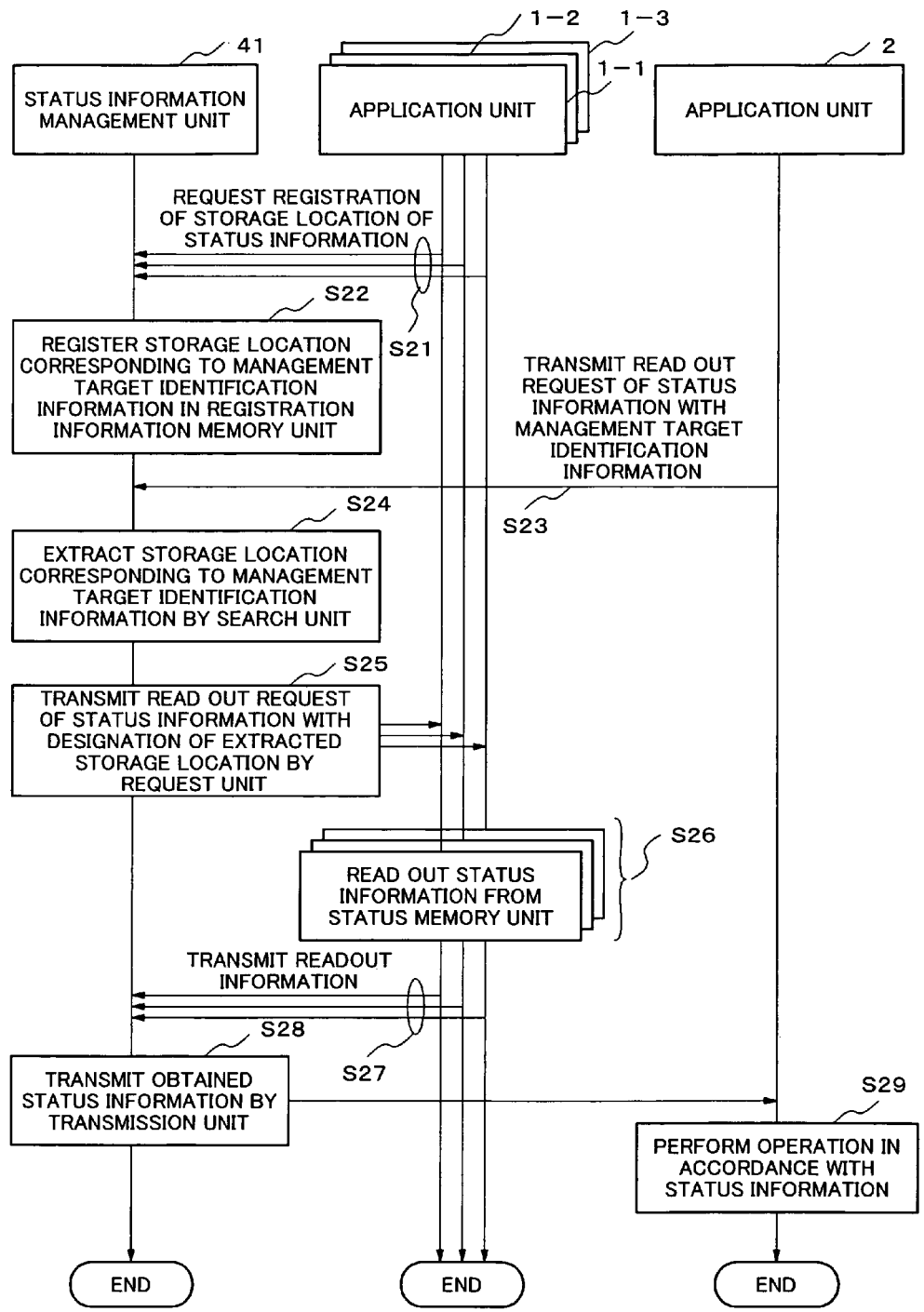
FIG. 6 is a sequence diagram showing an operation according to the second embodiment.

FIG. 6 is a sequence diagram showing the operation of the second embodiment. FIG. 7 is a view showing the contents stored in the registration-information memory unit 5.

The application unit 1-1 manages a connection status of a communication channel of each of the line interface circuits 98. FIG. 8A is a view showing the contents of a status memory unit 3-1, managed by the application unit 1-1. FIG. 8B is a view showing the contents of a status memory unit 3-2, managed by the application unit 1-2. FIG. 8C is a view showing the contents of a status memory unit 3-3, managed by the application unit 1-3.

First, the application units 1-1 to 1-3 transmit the management target identification information ("the communication channel A", "the communication channel B" . . . , and so on of FIG. 7) kept in advance and the registration request information, to which the storage location of the status information is added, to the status-information management unit 41. In this case, the storage locations are, for example, indicated by memory addresses of the application units 1-1 to 1-3 respectively as the areas a1, a2, and a3 in the case of the communication channel A, and indicated by memory addresses of the application units 1-1 to 1-3 respectively as the areas b1, b2, and b3 in the case of the communication channel B. The status-information management unit 41 receiving the notification registers the storage location information in the registration-information memory unit 5 based on the received registration request information including the management target identification information and the storage location. A detailed registration processing in this case is as follows.

For example, upon start-up of the base station controller 90, the application units 1-1 to 1-3 create the status memory units 3. Specifically, the application units 1-1 to 1-3 sequentially confirm the presence/absence of the line interface circuits 98. If the line interface circuit 98 is present, an address is allocated to the present line interface circuit 98. Then, the application units 1-1 to 1-3 generate management target identification information (for example, "the communication channel A"), sets the generated identification information in the area indicated by the allocated address. In this case, the area indicated by the allocated address is preserved so as to store a status (a connection status, an error status on a communication channel, and a lock status). The information set in the preserved area may include information such as the identification information of the line interface circuits 98 in addition to the management target identification information and the above-described status. In this manner, the application units 1-1 to 1-3 check all the line interface circuits 98 to create the status memory units 3. The status memory units 3 created at this time are, for example, the ones as shown in FIG. 8A for the application unit 1-1, the ones as shown in FIG. 8B for the application unit 1-2, and the ones as shown in FIG. 8C for the application unit 1-3. After that, the application units 1-1 to 1-3 add information containing its own identification information (for example, "AP11", "AP12", and "AP13"), the set management target identification information, and its storage location (for example, an address in the memory) to the registration request information. The application units 1-1 to 1-3 transmit the added registration request information to the status-information management unit 41 to make a request for registration to the registration-information memory unit 5 (sequence S21 of FIG. 6). After the registration request, the application unit 1-1 performs a connecting operation with the base station for each of the line interface circuits 98. The application unit 1-1 registers the result of the connecting operation ("connected" or "disconnected") in the area of the corresponding communication channel in the status memory unit 3-1.

On the other hand, the status-information management unit 41 receiving the registration request information from the respective application units 1-1 to 1-3 uses the management target identification information as a key to store the storage location of the status information corresponding to the identification information of the respective request sources ("AP11", "AP12", and "AP13") in the registration-information memory unit 5 (sequence S22). In this case, the storage location information contains the identification information of the application and the memory address. The created registration-information memory unit 5 is, for example, the one as shown in FIG. 7. In this manner, the status-information management unit 41 performs the registration processing of the storage location of the status information corresponding to the application units 1-1 to 1-3, and terminates the process of creating the registration-information memory unit 5 at the time of start-up of the device.

Next, the application unit 1-1 monitors the communication channel for each of the line interface circuits 98. When a status change occurs, the result of change ("connected" or "disconnected") is registered in the area of the connection status corresponding to the communication channel with a change in the status memory unit 3.

At predetermined time intervals, the application unit 1-2 obtains the number of occurred errors in each of the line interface circuits 98 and the number of received packets in the predetermined time period between the time intervals to calculate an error rate. Furthermore, the application unit 1-2 registers the calculated error rate in an error status area in the status memory unit 3 corresponding to the communication channel of the calculated error rate.

When the operator sets "lock ON" or "lock OFF" for a particular one of the line interface circuits 98 through the operation unit 95, the application unit 1-3 puts the designated line interface circuit 98 into a locked state or a lock-off state. Furthermore, the application unit 1-3 registers the result ("ON" or "OFF") in the area of the lock status corresponding to the communication channel designated in the status memory unit 3. When the device is powered ON, all the lock status areas in the status memory unit 3 for the application unit 1-3 are "OFF".

When the information of "the communication channel A" is required to be read out, the application unit 2 sends the request information for reading out the status information to the status-information management unit 41 (sequence S23). The request information in this case contains the management target identification information, i.e., "the communication channel A", as a key for reading out the status information. In the example, a predetermined value is set for a timer (not shown) so as to enable an interrupt action to the application unit 2 in the control circuit 91 at predetermined time intervals. The application unit 2 transmits the request information for reading out the status information to the status-information management unit 41 each time the application unit 2 is interrupted by the timer.

The status-information management unit 41 receiving the request information passes control to the search unit 6. The search unit 6 taking control searches the storage location information of the status information from the registration-information memory unit 5 based on the received "communication channel A" as a key for extracting the storage location of the status information. As a result of the search, the search unit 6 extracts the storage locations ("the area a1 in the AP 11", "the area a2 in the AP12", and "the area a3 in the AP 13") (sequence S24). The search unit 6 passes control to the request unit 7.

The request unit 7 of the status-information management unit 41 adds information containing the storage location information (the area a1 in the AP11") and the management target identification information ("the communication channel A") to the request information and transmits the request information for reading out the status information to the application unit 1-1 corresponding to the AP 11 (sequence S25).

Furthermore, the request unit 7 of the status-information management unit 41 adds information containing the storage location information (the area a2 in the "AP12") and the management target identification information ("the communication channel A") to the request information and transmits the request information for reading out the status information to the application unit 1-2 corresponding to the AP 12 (sequence S25).

Furthermore, the request unit 7 of the status-information management unit 41 adds information containing the storage location information (the area a3 in the "AP13") and the management target identification information ("the communication channel A") to the request information and transmits the request information for reading out the status information to the application unit 1-3 corresponding to the AP 13 (sequence S25).

The information of "the communication channel A" is formed as one useful status information only after all the three status information kept by the three application units 1-1 to 1-3 are gathered.

The application unit 1-1 receiving the request information reads out the status information "connected" from the status memory unit 3-1 based on the received "area a1" and "communication channel A" to transmit the readout status information to the status-information management unit 41 (sequences S26 and S27). The application unit 1-2 receiving the request information reads out the error information on the communication channel "error rate of 0.1%" from the status memory unit 3-2 based on the received "area a2" and "communication channel A" to transmit the readout error information to the status-information management unit 41 (sequences S26 and S27). The application unit 1-3 receiving the request information reads out the lock status information "OFF" from the status memory unit 3-3 based on the received "area a3" and "communication channel A" to transmit the readout lock status information to the status-information management unit 41 (sequences S26 and S27). In this case, since the application units 1-1 to 1-3 can use the memory address to directly designate the storage location of the status information, a search time can be reduced as compared with a search method of using the management target identification information.

The application units 1-1 to 1-3 may also use only the management target identification information of to search through the status memory units 3-1 to 3-3 to extract the connection information corresponding to the status information although a processing time is longer than that of the direct access to the memory. Therefore, when only the management target identification information is used, the memory address may be omitted from the registration-information memory unit 5. In this case, however, application identification information is required as information of the storage location.

On the other hand, the status-information management unit 41 receiving the status information passes control to the status-information aggregating unit 9. The status-information aggregating unit 9 taking control waits until all the status information from the three application units 1-1 to 1-3 are obtained. When all the status information are obtained, the status-information aggregating unit 9 transmits the status information received from the application units 1-1 to 1-3 to the application unit 2 corresponding to a request source (sequence S28).

The application unit 2 receiving the status information indicating that "the communication channel A" is "connected", with "the error rate of 0.1%" and "OFF" switches its operation in accordance with the status. Specifically, the application unit 2 compares each received information with the conditions preset in the storage unit 92 and indicates information that a particular communication channel is available on the display unit 84 because the conditions are satisfied (sequence S29). The conditions in this case are, for example, a connected status, the error rate of 0.5% or less, and a lock-OFF status.

As described above, the status-information management unit 41 receives the request information for obtaining the status information, to which the management target identification information is added, from the application unit 2 requiring the status information. Then, the status-information management unit 41 extracts the storage location information from the registration-information memory unit 5 to transmit the request information with the storage location information for obtaining the status information to the application unit 1. Therefore, in the second embodiment of the present invention, the status-information management unit 41 is not required to confirm whether or not the application unit 1 retains the latest status information.

Moreover, in the second embodiment of the present invention, the application units 1 and 2 are not required to be conscious of each other's presence. Therefore, the status information can be transmitted and received between the applications in a simple control procedure.

Furthermore, as described above, the plurality of application units 1 are provided. Instead of storing the status information kept by the plurality of application units 1 in the registration-information memory unit 5, the status-information management unit 41 stores the storage location information of the status information in the registration-information memory unit 5. Therefore, in the second embodiment of the present invention, even if the number of the application units 1 increases, it is not necessary to manage each of status information present in the application units 1 in a complicated manner, and thereby the maintenance is simplified. Furthermore, in the second embodiment of the present invention, since it is not necessary to manage the status information in which a change frequently occurs, inconsistency in status does not occur between the application units 1 and the status-information management unit 41. Moreover, in the second embodiment of the present invention, even if the number of the application units 1 increases, it is not necessary to manage the status information in which a change frequently occurs. Accordingly, even if the number of the application units 1 increases, a load on a CPU does not increase.

The second embodiment is excellent in the following points as compared with the first, embodiment. Specifically, the status-information management unit 41 manages a plurality of status information distributed to the application units 1-1 to 1-3, which correspond to one management target, based on their storage locations. Furthermore, after aggregating the status information obtained from the application units 1-1 to 1-3, the status-information management unit 41 transmits the aggregated status information to the application unit 2 requesting the acquisition of the status information. Therefore, in the second embodiment, the plurality of status information are transmitted to the application unit 2 after being aggregated into one. Therefore, the application unit 2 and the status-information management unit 41 does not come out of synchronization.

In the above-described second embodiment, after the status-information management unit 41 receives the request information for obtaining the status information from the application unit 2, the search unit 6 in the status-information management unit 41 extracts the storage location information corresponding to the management target identification information from the registration-information memory unit 5. In the second embodiment, however, instead of using the registration-information memory unit 5, the search unit 6 may calculate the storage location information corresponding to the management target identification information by a calculation formula. In this case, the management target identification information corresponds to an input of the calculation formula, while the storage location information corresponds to an output of the calculation formula.

Next, a third embodiment of the present invention will be described with reference to FIGS. 1, 8A through 8C, 9, and 10.

Figure 9:
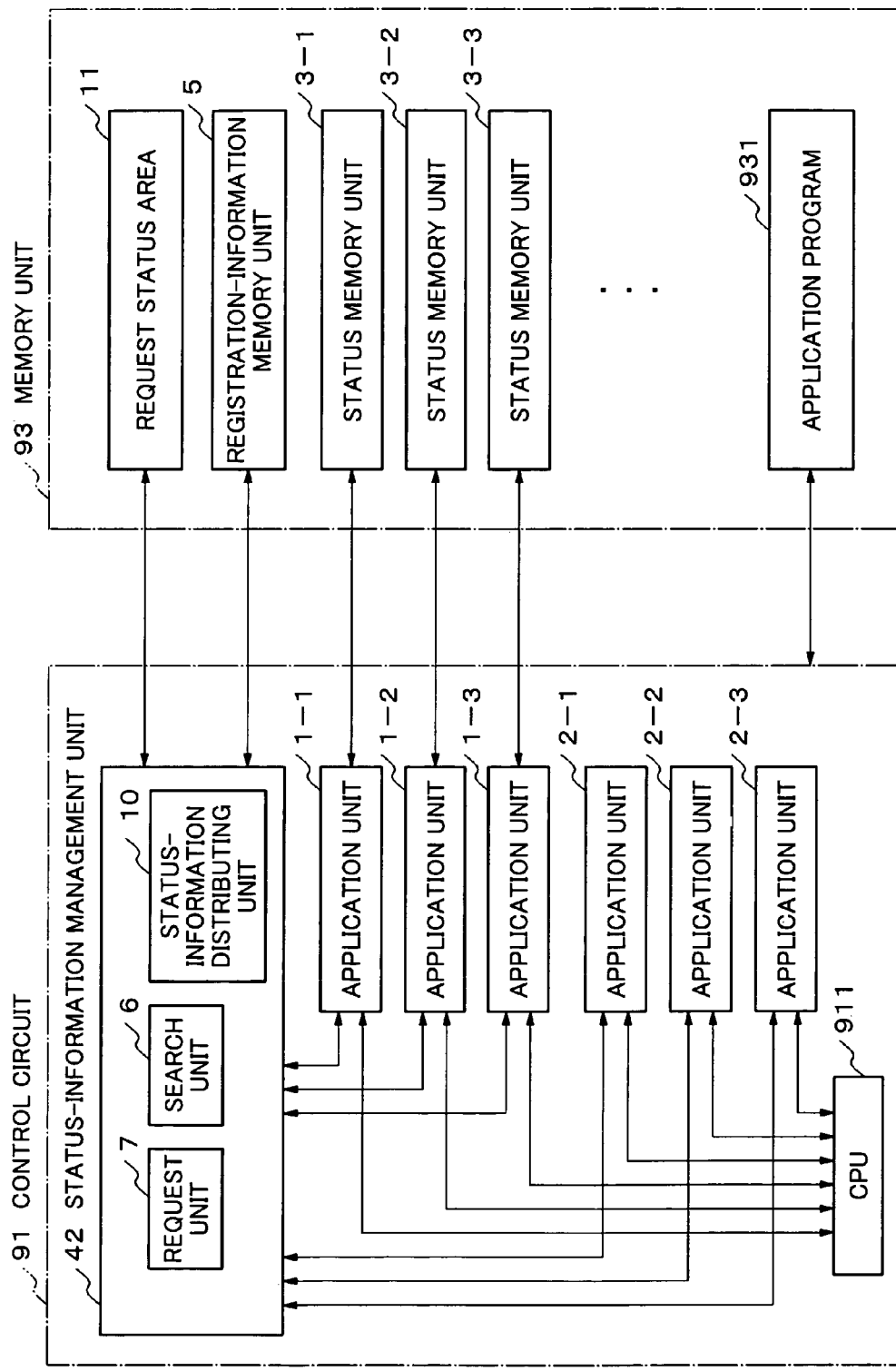
FIG. 9 is a block diagram showing configurations of the control circuit and the memory unit shown in FIG. 1 according to the third embodiment.

FIG. 9 is a view showing configurations of the control circuit 91 and the memory unit 93 shown in FIG. 1. The CPU 911 in the control circuit 91 is connected to each of the storage unit 92, the display unit 94, the operation unit 95, the recording medium control unit 96, the line interface circuit 97, and the line interface circuits 98. However, the storage unit 92, the display unit 94, the operation unit 95, the recording medium control unit 96, the line interface circuit 97, and the line interface circuits 98, which are connected to the CPU 911, are omitted from FIG. 9.

The control circuit 91 includes the CPU 911, a status-information management unit 42, the application units 1-1, 1-2, and 1-3, and application units 2-1, 2-2, and 2-3.

The status-information management unit 42 includes the request unit 7, the search unit 6, and a status-information distributing unit 10.

The memory unit 93 includes the request status area 11, the registration-information memory unit 5, the status memory units 3-1 to 3-3, and the application program 931. During the operation of the base station controller 90, various programs are written to the memory unit 93. However, various programs as well as the application program 931 are omitted from FIG. 9.

The third embodiment differs from the second embodiment in that the status-information aggregating unit 9 is replaced by the status-information distributing unit 10, the application unit 2 is replaced by the application units 2-1, 2-2, and 2-3, and a request status area 11 is added. Specifically, the third embodiment presupposes that the plurality of application units 2-1 to 2-3 transmitting acquisition requests, which correspond to one or more management target, are provided. For this reason, the third embodiment includes the status-information distributing unit 10. Specifically, the status-information distributing unit 10 obtains status information corresponding to one or more management target requested by the request unit 7 to the application units 1 and then distributes the obtained status information to the application units 2-1 to 2-3. Furthermore, the status-information distributing unit 10 has the function of the status-information aggregating unit 9 described in the second embodiment.

The request status area 11 stores identification information of the application units 2 requesting the status information and the management target identification information. The request status area 11 is provided to prevent one of the application units 2 from making a read request of the status information while another one of the application units 2 is requesting the acquisition of the same status information.

The application program 931 executed by the control circuit 91 includes the information management program 921, the application programs a1, a2, and a3 (not shown), and monitor programs c1, c2, and c3 (not shown). In this case, the status-information management unit 42 represents a functional block when the information management program 921 is executed under the control of the CPU 911 to manage the registration information of the status memory units 3-1 to 3-3 respectively managed by the application units 1-1 to 1-3. The application unit 1-1 represents a functional block when executing the application program a1 under the control of the CPU 911. The application unit 1-2 represents a functional block when executing the application program a2 under the control of the CPU 911. The application unit 1-3 represents a functional block when executing the application program a3 under the control of the CPU 911. Each of the application units 1-1 to 1-3 in this case performs processings including management of the connection statuses of the plurality of line interface circuits 98 and communication control with the base station 81. The application unit 2-1 represents a functional block when executing the monitor program c1 under the control of the CPU 911 to monitor the plurality of line interface circuits 98. The application unit 2-2 represents a functional block when executing the monitor program c2 under the control of the CPU 911 to monitor the plurality of line interface circuits 98. The application unit 2-3 represents a functional block when executing the monitor program c3 under the control of the CPU 911 to monitor the plurality of line interface circuits 98.

For easy understanding of the description, it is assumed that the monitor program c1 is executed, for example, when a monitor request from the operation unit 95 is received under the control of the CPU 911. In the same manner, the monitor program c2 is executed, for example, in response to a monitor request received through the wired network 82 under the control of the CPU 911. The monitor program c3 is for obtaining, for example, a history of information of the line interface circuits 98 under the control of the CPU 911.

Furthermore, for easy understanding of the description, as in the second embodiment, it is assumed that the application a1 is a program for managing the connection status, the application program a2 is a program for managing error information of the communication channel, and the application program a3 is a program for managing a locked status.

The format of the registration-information memory unit 5 is determined at the time of system construction. The identification information of the application units 1 and the management target identification information, which are to be format information, are preset in the storage unit 92. Therefore, the status-information management unit 42 of the control circuit 91 creates the registration-information memory unit 5 in the memory unit 93 based on the format information of the registration-information memory unit 5 set in the storage unit 92 for the start-up of the system. In this case, among the management target items and the items of storage locations of the statuses, the identification information of the application units 1-1 to 1-3 (in the example, "AP11", "AP12", and "AP13"; see reference numerals 51, 52, and 53 of FIG. 7) and the plurality of management target identification information are registered in the registration-information memory unit 5. Specifically, during the operation, storage location information (application identification information and an address) is registered in an area for the storage location corresponding to the management target in the registration-information memory unit 5. However, upon start-up of the system, the area is left blank.

When the application units 1-1 to 1-3 and 2-1 to 2-3 transmit and receive data to/from the status-information management unit 42, the data transmission and reception are performed through, for example, a specific area (not shown) in the memory unit 93. Specifically, when outputting (transmitting) request information (containing added information) or data information to the destination, each of the application units 1-1 to 1-3, 2-1 to 2-3, and the status-information management unit 42 writes the request information or the requested data information in the specific area in the memory unit 93. When receiving the request information from another party of the communication, each of the application units 1-1 to 1-3, 2-1 to 2-3, and the status-information management unit 42 analyzes the request information written in the specific area to execute it. After the completion of the processing according to the analysis, the request information is cleared. The request information according to the third embodiment of the present invention in this case means, for example, information for a registration request (for example, a registration request of a storage location), information for an acquisition request (for example, an acquisition request of status information), and the like. The requested data information means data (for example, status information) read out in response to the request information (for example, a read request of the data). In the following description of the operation, the above-described description is omitted for easy understanding of the description. Only the transmission and reception of the request content or the data content will be described.

Figure 10:
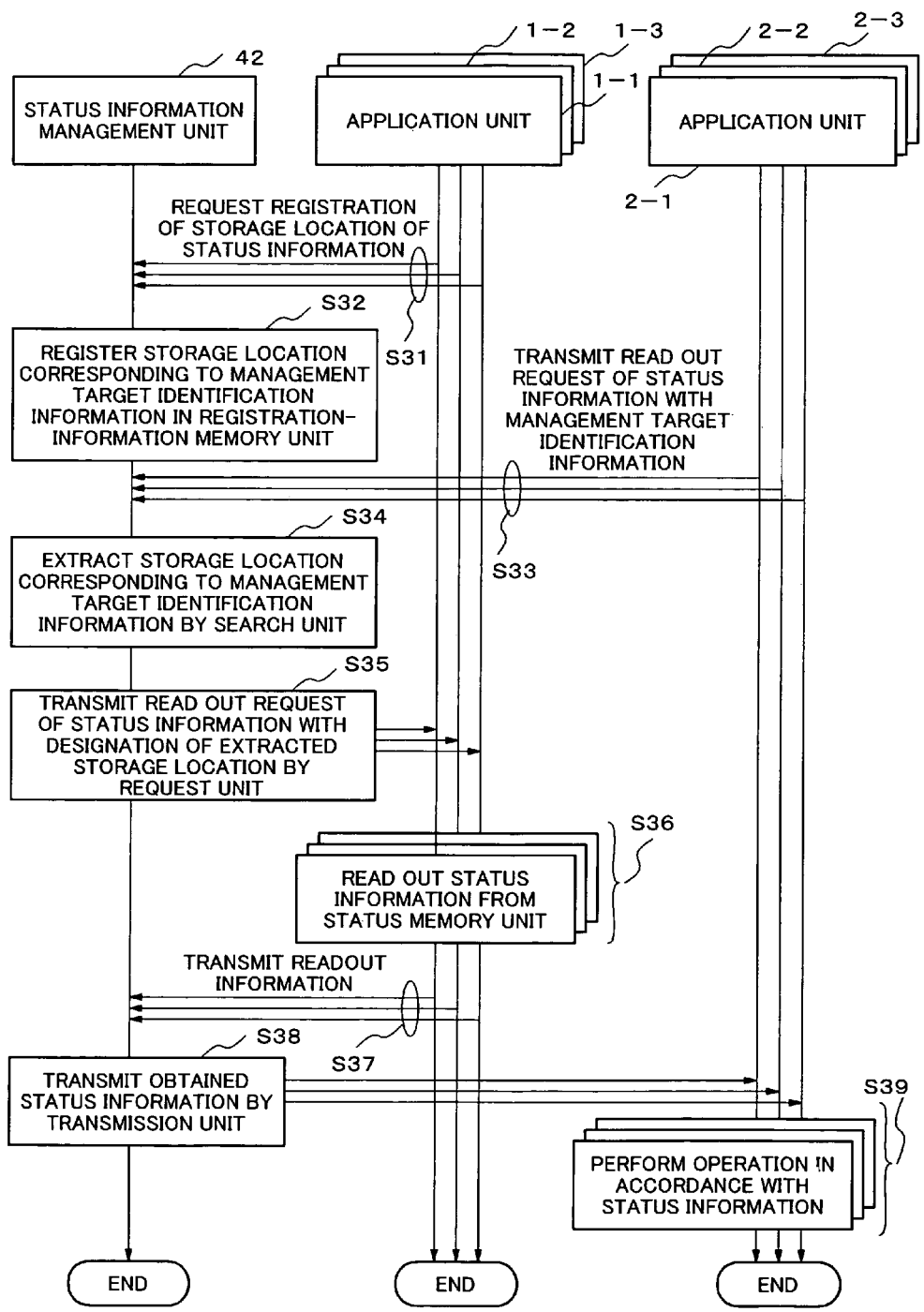
FIG. 10 is a sequence diagram showing an operation according to the third embodiment.

Next, with reference to FIGS. 1, 8A to 8C, 9, and 10, the operation of the third embodiment of the present invention will be described in detail. FIG. 10 is a sequence diagram showing the operation of the third embodiment.

First, the application units 1-1 to 1-3 transmit the registration request information, to which the management target identification information ("the communication channel A", "the communication channel B", and so on) kept in advance and the storage location of the status information (the area a1 in the status memory unit 3, the area b1 in the status memory unit 3, and so on) is added, to the status-information management unit 42 so as to make a registration request of the storage location. In this case, the areas a1 and b1 are addresses in the memory unit 93. The status-information management unit 42 registers the storage location information in the registration-information memory unit 5 in the memory unit 93 based on the notified registration information including the management target identification information and the storage location. A detailed registering processing in this case is as follows.

For example, upon start-up of the base station controller 90, the application units 1-1 to 1-3 create the status memory units 3. Specifically, the application units 1-1 to 1-3 sequentially confirm the presence/absence of the line interface circuits 98. If the line interface circuit 98 is present, an address is allocated to the present line interface circuit 98. Furthermore, the application units 1-1 to 1-3 generate management target identification information (for example, "the communication channel A") to be set in the area indicated by the allocated address to set the generated identification information in the area indicated by the allocated address. In this case, the area indicated by the allocated address is preserved so as to store a status (a connection status, an error status on a communication channel, and a lock status). The information set in the preserved area may include information such as the identification information of the line interface circuits 98 in addition to the management target identification information and the connection status. In this manner, the application units 1-1 to 1-3 check all the line interface circuits 98 to create the status memory units 3. The status memory units 3 created at this time are, for example, as shown in FIGS. 8A to 8C. After that, the application units 1-1 to 1-3 add the thus set management target identification information and its storage location (for example, an address in the memory) to the registration request information. The application units 1-1 to 1-3 transmit the added registration request information to the status-information management unit 42 to make a request of registration to the registration-information memory unit 5 (sequence S31 of FIG. 10). After the registration request, the application unit 1-1 performs a connecting operation with the base station for each of the line interface circuits 98. The application unit 1-1 registers the result of the connecting operation ("connected" or "disconnected") in the area of the corresponding communication channel in the status memory units 3. Since the registration process of each of the application units 1-2 and 1-3 to its own status memory unit 3 is the same as that described in the second embodiment, the description is herein omitted.

On the other hand, the status-information management unit 42 receiving the request information stores the storage location of the status information in the registration-information memory unit 5 based on the management target identification information as a key for searching the storage location of the status information (sequence S32). In this case, the storage location information contains the identification information of the application and the memory address. The created registration-information memory unit 5 is, for example, that shown in FIG. 7. In this manner, the status-information management unit 42 performs the registration processing of the storage location of the status information corresponding to the application units 1-1 to 1-3, and terminates the process of creating the registration-information memory unit 5 at the time of start-up of the device.

Next, the application unit 1-1 monitors the communication channel for each of the line interface circuits 98. When a status change occurs, the result of change ("connected" or "disconnected") is registered in the area of the connection status corresponding to the communication channel with a change in the status memory unit 3-1.

At predetermined time intervals, the application unit 1-2 obtains the number of occurred errors in each of the line interface circuits 98 and the number of received packets between the predetermined time intervals to calculate an error rate. Furthermore, the application unit 1-2 registers the calculated error rate in an error status area in the status memory unit 3 corresponding to the communication channel of the calculated error rate.

When the operator sets "lock ON" or "lock OFF" for a particular one of the line interface circuits 98 through the operation unit 95, the application unit 1-3 puts the designated line interface circuit 98 into a locked state or a lock-off state. Furthermore, the application unit 1-3 registers the result ("ON" or "OFF") in the area of the lock status corresponding to the communication channel designated in the status memory unit 3. When the device is powered ON, all the lock status areas in the status memory unit 3 for the application unit 1-3 are "OFF".

On the other hand, it is assumed that the need for reading the status information arises almost simultaneously or within a predetermined time for the application units 2-1 to 2-3. Then, after attaching the identification information for identifying the management target (for example, "the communication channel A") to the request information, the application units 2-1 to 2-3 transmit the request information for obtaining the needed status information to the status-information management unit 42 (sequence S33). As a timing of the request of the application unit 2-1, for example, a predetermined value is set for a timer (not shown) so as to enable an interrupt action of the application unit 2-1 of the control circuit 91, for example, at predetermined time intervals. The application unit 2-1 transmits the request information for reading out the status information to the status-information management unit 42 each time the application unit 2-1 is interrupted by the timer.

It is assumed that, for example, the status-information management unit 42 first receives the request information from the application unit 2-1. Then, the status-information management unit 42 receiving the request information passes control to the search unit 6. The search unit 6 taking control confirms whether or not the received identification information of the request source and the status type identification information (in the example, "the communication channel A") are registered in the request status are all. Since the information are not registered yet in the request status area 11 as a result of the search, the search unit 6 stores the identification information of the application unit 2-1 corresponding to the request source, from which the request is received, and the management target identification information (in the example, "the communication channel A") in the request status area 11. Furthermore, the search unit 6 extracts the storage locations ("the area a1 in the AP 11", "the area a2 in the AP12", and "the area a3 in the AP 13") of the status information from the registration-information memory unit 5 based on the received "communication channel A" as a key for searching the storage location (sequence S34). After that, the search unit 6 passes control to the request unit 7.

The request unit 7 of the status-information management unit 42 adds information containing the storage location information ("the area a1 in the AP11") and the management target identification information ("the communication channel A") to the request information, and transmits the request information for reading out the status information to the application unit 1-1 corresponding to the "AP 11" (sequence S35).

Furthermore, the request unit 7 adds information containing the storage location information and the management target identification information to the request information, and then transmits the request information for reading out the status information to the application unit 1-2 corresponding to the "AP12" and the application unit 1-3 corresponding to the "AP 13" (sequence S35).

The application unit 1-1 receiving the request information reads out the status information "connected" from the status memory unit 3-1 based on the received "area a1" and "communication channel A" to transmit the readout status information to the status-information management unit 42 (sequences S36 and S37).

The application unit 1-2 receiving the request information reads out the status information "connected" from the status memory unit 3-2 based on the received "area a2" and "communication channel A" to transmit the readout status information to the status-information management unit 42 (sequences S36 and S37).

The application unit 1-3 receiving the request information reads out the status information "connected" from the status memory unit 3-3 based on the received "area a3" and "communication channel A" to transmit the readout status information to the status-information management unit 42 (sequences S36 and S37).

In this case, since the application units 1-1 to 1-3 can use the memory addresses to directly designate the storage locations of the status information, a search time can be reduced as compared with a search method of using the management target identification information.

The application unit 1 may also use only the management target identification information to search through the status memory unit 3 to extract the connection information corresponding to the status information although a processing time is longer than that of the direct access to the memory. Therefore, when only the management target identification information is used, the memory address may be omitted from the registration-information memory unit 5. In this case, however, application identification information is required as information of the storage location.

On the other hand, when the status-information management unit 42 receives the request information for reading out the status information for the "communication channel A" from the application units 2-2 and 2-3 while the request unit 7 of the status-information management unit 42 is requesting the acquisition of the status information, the status-information management unit 42 passes control to the search unit 6. Then, the search unit 6 confirms whether or not "the communication channel A" is registered in the request status area 11. Since "the communication channel A" is registered as a result of the confirmation, the search unit 6 stores the identification information of the application units 2-2 and 2-3 corresponding to the request sources, from which the requests are received, and the management target identification information (in the example, "the communication channel A") corresponding to the respective identification information of the application units 2-2 and 2-3 in the request status area 11. Furthermore, the search unit 6 terminates the processing without passing control to the request unit 7. Therefore, since the request unit 7 does not take control from the search unit 6, the request unit 7 does not transmit the request information for obtaining the status information to the application units 1-1 to 1-3. In this case, the request area 11 stores the identification information of the application units 2-1 to 2-3 and the management target identification information (in the example, "the communication channel A") corresponding to the respective identification information of the application units 2-1 to 2-3.

On the other hand, the status-information management unit 42 passes control to the status-information distributing unit 10 each time receiving the status information. The status-information distributing unit 10 taking control waits until all the status information from the three application units 1-1 to 1-3 are obtained. When all the status information are obtained, the status-information distributing unit 10 searches for the request source registered as "the communication channel A" in the request status area 11 to extract the identification information of the application units 2-1 to 2-3. In order to transmit the same status information to the extracted application units 2-1 to 2-3 corresponding to the request sources, the status-information distributing unit 10 aggregates three status information received from the application units 1-1 to 1-3 and obtains three copies of the aggregated status information. The status-information distributing unit 10 transmits on of three copies of the status information to the application units 2-1 to 2-3 corresponding to the request sources, respectively (sequence S38). Furthermore, the status-information distributing unit 11 clears the information corresponding to "the communication channel A" (in the example, the identification information of the application units 2-1 to 2-3 and "the communication channel A" registered with each of the identification information) in the request status area 11.

The application units 2-1 to 2-3 receiving the notification that "the communication channel A" is in a "connected" status switch their operations in accordance with the status (sequence S39).

As described above, the status-information management unit 42 receives the request information for obtaining the status information, to which the management target identification information is added, from the application units 2 requiring the status information. Then, the status-information management unit 42 extracts the storage location information from the registration-information memory unit 5 to transmit the request information with the storage location information for obtaining the status information to the application units 1. Therefore, in the third embodiment of the present invention, the status-information management unit 42 is not required to confirm whether or not the application units 1 store the latest status information.

Moreover, in the third embodiment of the present invention, the application unit 1 and the application unit 2 are not required to be conscious of each other's presence. Therefore, the status information can be transmitted and received between the applications in a simple control procedure.

Furthermore, in the above description, when the plurality of application units 1 are present, the status-information management unit 42 does not store the status information kept by the plurality of application units 1 in the registration-information memory unit 5 managed by itself but stores the storage location information of the status information in the registration-information memory unit 5. Therefore, in the third embodiment of the present invention, even if the number of the application units 1 increases, it is not necessary to manage the status information present in the application units 1 in a complicated manner, and thereby the maintenance simplified. Furthermore, in the third embodiment of the present invention, since it is not necessary to manage the status information in which a change frequently occurs, inconsistency in status does not occur between the application units 1 and the status-information management unit 42. Moreover, in the second embodiment of the present invention, even if the number of the application units 1 increases, it is not necessary to manage the status information in which a change frequently occurs. Accordingly, even if the number of the application units 1 increases, a load on a CPU does not increase.

The third embodiment is excellent in the following points as compared with the first and second embodiments. Specifically, in the above description, when the plurality of application units 2 requesting the acquisition of the status information of the same management target are present, the status-information distributing unit 10 distributes the status information obtained in response to acquisition requests (request information for reading out the status information) to the plurality of applications making the plurality of acquisition requests. Therefore, in the third embodiment of the present invention, even if the plurality of acquisition requests are issued for the same management target, it is no longer necessary to make the acquisition request for the same status information twice to the application units 1. Furthermore, even if a acquisition request for a management target is outputted from one application unit 2 while the acquisition request for the management target is outputted to the application unit 1, the status-information distributing unit 10 of the status-information management unit 42 does not make the acquisition request information so as not to output the same acquisition request twice. Therefore, in the third embodiment of the present invention, the application units 1 are prevented from performing an extra processing.

In the third embodiment, after the status-information management unit 42 receives the request information for obtaining the status information from the application units 2-1 to 2-3, the search unit 6 of the status-information management unit 42 extracts the storage location information corresponding to the management target identification information from the registration-information memory unit 5. In the third embodiment, however, instead of using the registration-information memory unit 5, the search unit 6 may calculate the storage location information corresponding to the management target identification information by a calculation formula. In this case, the management target identification information corresponds to an input of the calculation formula, while the storage location information corresponds to an output of the calculation formula.

The first to third embodiments have been described above taking the base station controller as an example of the status management device. However, a computer (for example, a personal computer, a work station, a server, a PDA, or the like) operated by program control of a CPU may also be applied to the present invention. The PDA in this case is an abbreviation for Personal Digital Assistance.

Although the group of the application units 1, the group of the application units 2, and the status-information management unit are operated under the control of the same control circuit 91 (the CPU 911) in the above description, they may also be functional blocks operated by program control of different CPUs. Furthermore, the application units 1-1 to 1-3 may be functional blocks operated by program control of different CPUs. Furthermore, the application units 2-1 to 2-3 may be functional blocks operated by program control of different CPUs. In this case, since the transmission and reception of data between each of the plurality of application units 1 and 2 and the status-information management unit are performed through an internal bus, the data transmission and reception differ from those in the above-described first to third embodiments in which data is transmitted and received through a particular area. Otherwise, the remaining operation is the same as that described in the first to third embodiments. Therefore, the detailed description thereof is herein omitted. As an operation on the internal bus in this case, data (request information or data information) is transmitted on the internal bus in accordance with a protocol on the bus. The internal bus may be separately provided for a control system and a data system using control signals or may be a serial bus using packet communication. On the other hand, a computer system, in which a CPU device including the application units 1 (1-1 and so on), a CPU device including the application units 2 (2-1 and so on), and a CPU device including the status-information management unit are connected independently through a LAN, is conceivable. Even in this case, a difference resides only in a communication medium (corresponding to the serial bus) for transmitting and receiving data. Therefore, it is apparent that the computer system supposing the LAN is encompassed in the scope of the embodiments of the present invention.

Although the group of the status memory units 3 (3-1, 3-2, and so on) are allocated to a certain area in the same memory unit 93 in the above embodiment, the status memory units 3 may also be allocated to different memory units.

Although the storage unit 92 is the non-volatile recording medium device in the above description, the storage unit 92 may also be a non-volatile memory (for example, a flash memory or the like).

Although the registration-information memory unit 5, the status memory units 3, and request status area 11 are allocated in the volatile memory in the above description, they may also be allocated in the non-volatile memory (for example, a flash memory or the like) or the non-volatile recording medium device (for example, a magnetic disk, or an optical disk).

Further, it is the inventor's intent to retain all equivalents of the claimed invention even if the claims are amended during prosecution.

What is claimed is:

1. A status management device, comprising:
   one or a plurality of first application units for monitoring status information indicating a status of a plurality of communication channels;
   a storage device for storing a correspondence table having identification information of each of the plurality of communication channels and a storage location of status information for each of the plurality of communication channels respectively associated therewith;
   one or a plurality of second application units for outputting first acquisition request information of the status information with identification information of one of the plurality of communication channels;
   a search unit for outputting the storage location corresponding to the identification information based on the correspondence table, when the first acquisition request information is received from the second application unit, the outputted storage location comprises a memory address indicating a memory location storing the status information;
   a request unit for outputting second acquisition request information of the status information to the first application unit corresponding to the outputted storage location, the second acquisition request information comprising the storage location;
   a transmission unit for outputting the status information supplied from the first application unit in response to the second acquisition request information to the second application unit which corresponds to a request source of the first acquisition request information; and
   a CPU controlling at least said search unit, said request unit and said transmission unit,
   wherein the first application unit transmits a latest status information of a first application through the transmission unit whenever the first application unit receives the second acquisition request information from the request unit.

2. The status management device according to claim 1, further comprising:
   a plurality of memory units for storing different types of the status information corresponding to at least one communication channel of the plurality of communication channels by the first application unit; and
   an aggregating unit for aggregating a plurality of status information from the memory units which are respectively supplied from the plurality of first application units in response to the second acquisition request information and outputting the aggregated status information to the second application corresponding to the request source.

3. The status management device according to claim 1, further comprising:
   a distributing unit for outputting the status information supplied from the first application unit in response to the second acquisition request to a plurality of second application units corresponding to the request sources when the first acquisition request information for the same communication channel of the plurality of communication channels is received from the plurality of second application units corresponding to the request sources.

4. The status management device according to claim 1, wherein the search unit does not output the second acquisition request information to the first application unit when the first acquisition request information with the identification information of the same communication channel of the plurality of communication channels is received from another one of the second application units while the first acquisition request information is output to the first application unit.

5. The status management device according to claim 1, wherein the storage location further comprises identification information of the first application unit.

6. The status management device according to claim 1, further comprising a base station controller.

7. The status management device according to claim 6, wherein the status information processed by the first application unit of the base station controller contains at least one of connection status information of a respective communication channel of the plurality of communication channels with a base station, lock status information indicating whether or not to use the respective communication channel of the plurality of communication channels, error information on the respective communication channel of the plurality of communication channels, and error information of a line interface circuit for performing control to establish the respective communication channel of the plurality of communication channels.

8. A status management device, comprising:
   first application means for monitoring status information indicating a status of a plurality of communication channels;
   a storage means for storing a correspondence table having identification information of each of the plurality of communication channels and a storage location of status information for each of the plurality of communication channels respectively associated therewith;
   second application means for outputting first acquisition request information of the status information to which identification information of one of the plurality of communication channels is appended;
   search means for outputting the storage location corresponding to the identification information based on the correspondence table, when the first acquisition request information is received from the second application means, the outputted storage location comprises a memory address indicating a memory location storing the status information;

request means for outputting second acquisition request information of the status information to the first application means, which corresponds to the outputted storage location, the second acquisition request information comprising the storage location;

transmission means for outputting the status information supplied from the first application means in response to the second acquisition request information to the second application means which corresponds to a request source of the first acquisition request information; and processing means for controlling at least said search means, said request means and said transmission means, wherein the first application means transmits a latest status information of a first application through the transmission means whenever the first application means receives the second acquisition request information from the request means.

9. The status management device according to claim 8, further comprising:

a plurality of memory means for storing different types of the status information corresponding to at least one communication channel of the plurality of communication channels by the first application means; and aggregating means for aggregating a plurality of pieces of status information from the memory means which are respectively supplied from the plurality of first application units in response to the second acquisition request information and outputting the aggregated status information to the second application corresponding to the request source.

10. The status management device according to claim 8, further comprising:

distributing means for outputting the status information supplied from the first application means in response to the second acquisition request to the plurality of second application means corresponding to the request sources when the first acquisition request information for the same communication channel of the plurality of communication channels is received from the plurality of second application means corresponding to the request sources.

11. The status management device according to claim 8, wherein the search means does not output the second acquisition request information to the first application means when the first acquisition request information with the identification information of the same communication channel of the plurality of communication channels is received from another one of the second application units while the first acquisition request information is output to the first application means.

12. A status management method, comprising:

providing one or a plurality of first application units for monitoring status information indicating a status of a plurality of communication channels;

providing one or plurality of second application units for outputting first acquisition request information of the status information with identification information of one of the plurality of communication channels;

outputting a storage location corresponding to the identification information, based on a correspondence table, when the first acquisition request information is received from the second application unit, the outputted storage location comprises a memory address indicating a memory storing the status information, the correspondence table having identification information of each of the plurality of communication channels and a storage location of status information for each of the plurality of communication channels respectively associated therewith;

outputting second acquisition request information of the status information to the first application unit corresponding to the outputted storage location, the second acquisition request information comprising the storage location; and outputting status information supplied from the first application unit in response to the second acquisition request information to the second application unit which corresponds to a request source of the first acquisition request information, wherein a latest status information of a first application is output whenever the first application unit receives the second acquisition request information.

13. The status management method according to claim 12, further comprising:

storing different types of the status information corresponding to at least one communication channel of the plurality of communication channels by the first application unit; and aggregating a plurality of pieces of status information from the memory units, which are respectively supplied from the plurality of first application units in response to the second acquisition request information and outputting the aggregated status information to the second application corresponding to the request source.

14. The status management method according to claim 12, further comprising:

outputting the status information supplied from the first application unit in response to the second acquisition request to the plurality of second application units corresponding to the request sources when the first acquisition request information for the same communication channel of the plurality of communication channels is received from the plurality of second application units corresponding to the request sources.

15. The status management method according to claim 12, wherein the second acquisition request information is not output to the first application unit when the first acquisition request information with the identification information of the same communication channel of the plurality of communication channels is received from another one of the second application units while the first acquisition request information is output to the first application unit.

16. The status management method according to claim 12, wherein the storage location further comprises identification information of the first application unit.

17. A non-transitory recording medium for storing a program to be executed by a computer including a plurality of application units operated by program control, the program for causing the computer to execute:

outputting a storage location corresponding to received identification information, based on a correspondence table, when first acquisition information of status information with the identification information for identifying a communication channel of a plurality of communication channels is received from a first application unit requiring the status information, the outputted storage location comprises a memory address indicating a memory location managed by the first application unit storing the status information, the correspondence table having identification information of each of the plurality of communication channels and a storage location of status information for each of the plurality of communication channels respectively associated therewith;

outputting second acquisition information of the status information to a second application unit corresponding to the outputted storage location, the second acquisition request information comprising the storage location; and outputting the status information supplied from the second application unit in response to the second acquisition request information to the first application unit corresponding to a request source of the first acquisition request information, wherein a latest status information of a first application is output whenever the first application unit receives the second acquisition request information.

* * * * *